(12) United States Patent
Nishida et al.

(10) Patent No.: US 12,241,542 B1
(45) Date of Patent: Mar. 4, 2025

(54) PLANETARY CARRIER AND PLANETARY GEAR MECHANISM

(71) Applicant: KAWASAKI JUKOGYO KABUSHIKI KAISHA, Kobe (JP)

(72) Inventors: Takunobu Nishida, Kobe (JP); Akihito Abe, Kobe (JP); Isao Fujii, Kobe (JP); Taku Nishihira, Kobe (JP); Takenori Terada, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/394,523

(22) Filed: Dec. 22, 2023

(51) Int. Cl.
   *F16H 57/08* (2006.01)
   *F16H 1/28* (2006.01)
   *F02C 7/32* (2006.01)

(52) U.S. Cl.
   CPC ............ *F16H 57/082* (2013.01); *F16H 1/28* (2013.01); *F02C 7/32* (2013.01); *F05D 2260/40311* (2013.01)

(58) Field of Classification Search
   CPC . F16H 57/082; F16H 1/28; F05D 2260/40311
   See application file for complete search history.

(56) References Cited

U.S. PATENT DOCUMENTS

| | | | | |
|---|---|---|---|---|
| 2020/0072340 A1* | 3/2020 | Lefebvre | ............... | F16H 57/082 |
| 2020/0332858 A1* | 10/2020 | Dombek | ............... | F16H 1/2827 |
| 2021/0262397 A1* | 8/2021 | Di Giovanni | ....... | F16H 57/0479 |
| 2021/0317788 A1* | 10/2021 | Simon | .................... | F16H 57/082 |
| 2022/0412453 A1* | 12/2022 | Mouly | ................... | F16H 1/2827 |
| 2022/0412454 A1* | 12/2022 | Mouly | ................... | F16H 1/2827 |
| 2023/0044768 A1* | 2/2023 | Hilty | ...................... | B23K 26/21 |
| 2023/0250761 A1* | 8/2023 | Ptaszynski | .............. | F01D 25/18 |
| | | | | 475/331 |

FOREIGN PATENT DOCUMENTS

| | | |
|---|---|---|
| JP | 2015-514181 A | 5/2015 |
| WO | 2013/148419 A1 | 10/2013 |

* cited by examiner

*Primary Examiner* — Jacob S. Scott
*Assistant Examiner* — Farhana Pervin
(74) *Attorney, Agent, or Firm* — Sughrue Mion, PLLC (57) ABSTRACT

A planetary carrier includes: a first plate and a second plate which pivotally support planetary gears between opposing plate surfaces of the first and second plates such that the planetary gears are located on a circular path so as to be spaced apart from each other, the circular path being a path of rotational centers of the planetary gears; and coupling plates which are located between the opposing plate surfaces, are spaced apart from each other in a circumferential direction of the circular path, couple the first plate and the second plate, and are coupled to external members at positions away from the planetary gears in the circumferential direction. The coupling plates are coupled to the external members at an outside of the circular path in a radial direction. Each of the coupling plates is coupled to the first plate and the second plate only at a first side in the circumferential direction.

12 Claims, 6 Drawing Sheets

PLANETARY CARRIER AND PLANETARY
GEAR MECHANISM

BACKGROUND OF THE INVENTION

Field of the Invention

The present disclosure relates to a planetary gear mechanism, particularly to a planetary carrier pivotally supporting planetary gears.

Description of the Related Art

Published Japanese Translation of PCT Application No. 2015-514181 discloses a fan driving gear device of an aircraft gas turbine engine which includes a carrier that supports gears located in a circumferential direction. In aircrafts, the weight reduction of parts is required to improve fuel efficiency. However, when a planetary gear mechanism included in the aircraft is simply reduced in weight, the required rigidity of the planetary gear mechanism deteriorates.

SUMMARY OF THE INVENTION

A planetary carrier according to one aspect of the present disclosure includes: a first plate and a second plate which pivotally support planetary gears between opposing plate surfaces of the first and second plates such that the planetary gears are located on a circular path so as to be spaced apart from each other, the circular path being a path of rotational centers of the planetary gears; and coupling plates which are located between the opposing plate surfaces, are spaced apart from each other in a circumferential direction of the circular path, couple the first plate and the second plate, and are coupled to external members at positions away from the planetary gears in the circumferential direction. The coupling plates are coupled to the external members at an outside of the circular path in a radial direction. Each of the coupling plates is coupled to the first plate and the second plate only at a first side in the circumferential direction.

DETAILED DESCRIPTION

Hereinafter, embodiments will be described with reference to the drawings. In the following description, a "circumferential direction" denotes a circumferential direction of a circular path C that is a path of rotational centers of planetary gears 3. Unless otherwise specified, a "first side" denotes one side in the circumferential direction, and a "second side" denotes the other side in the circumferential direction. A "radial direction" denotes a radial direction of the circular path C. A "front-rear direction" denotes a rotation axis direction of a planetary carrier 2, 102. A front direction from the planetary carrier 2 is such a direction along the rotation axis direction that a first plate 20 is visually confirmed in front of a second plate 21. A rear direction from the planetary carrier 2 is such a direction along the axis direction that the second plate 21 is visually confirmed in front of the first plate 20.

Embodiment 1

Figure 1:
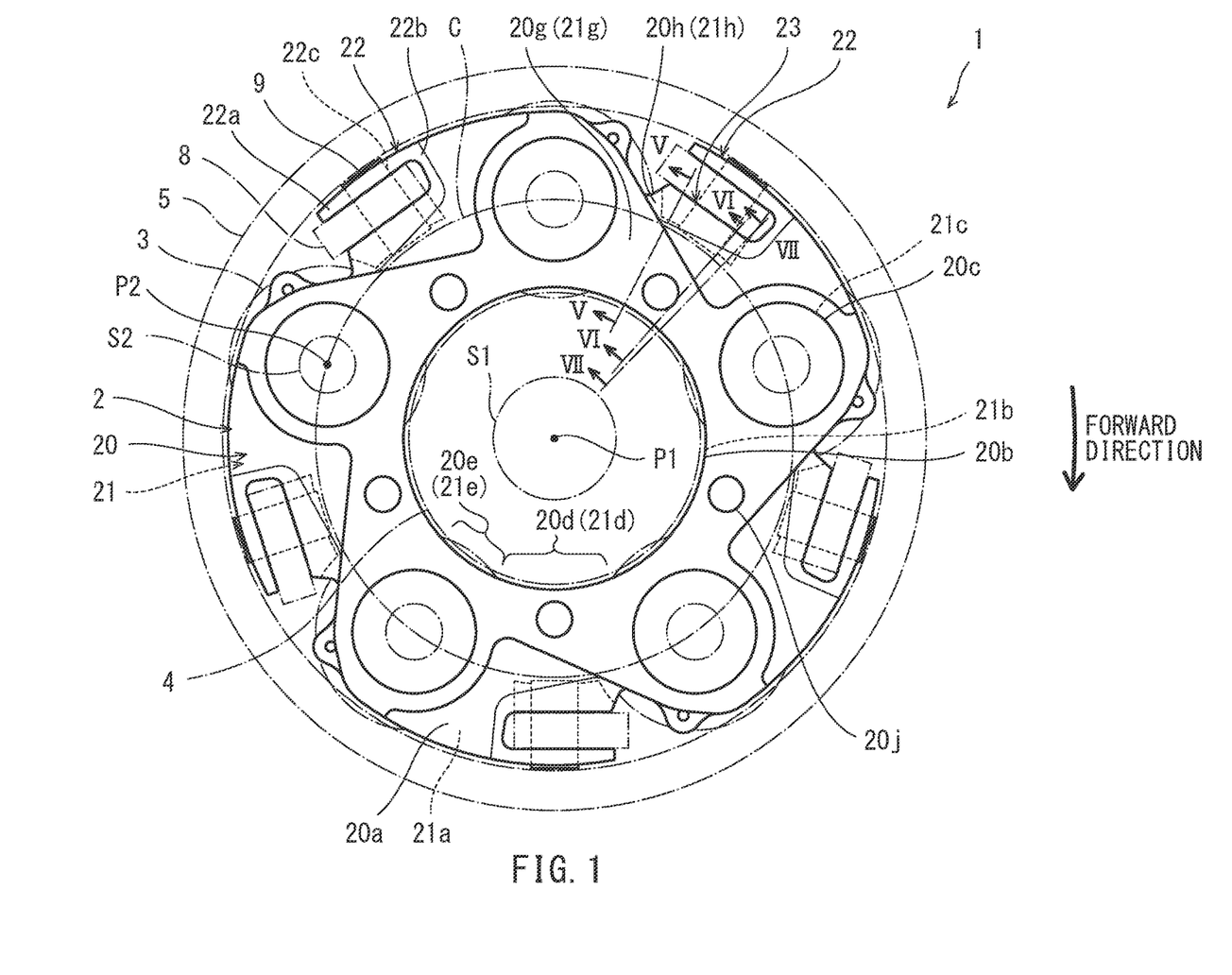
FIG. 1 is a front view of a planetary gear mechanism according to Embodiment 1.
Figure 2:
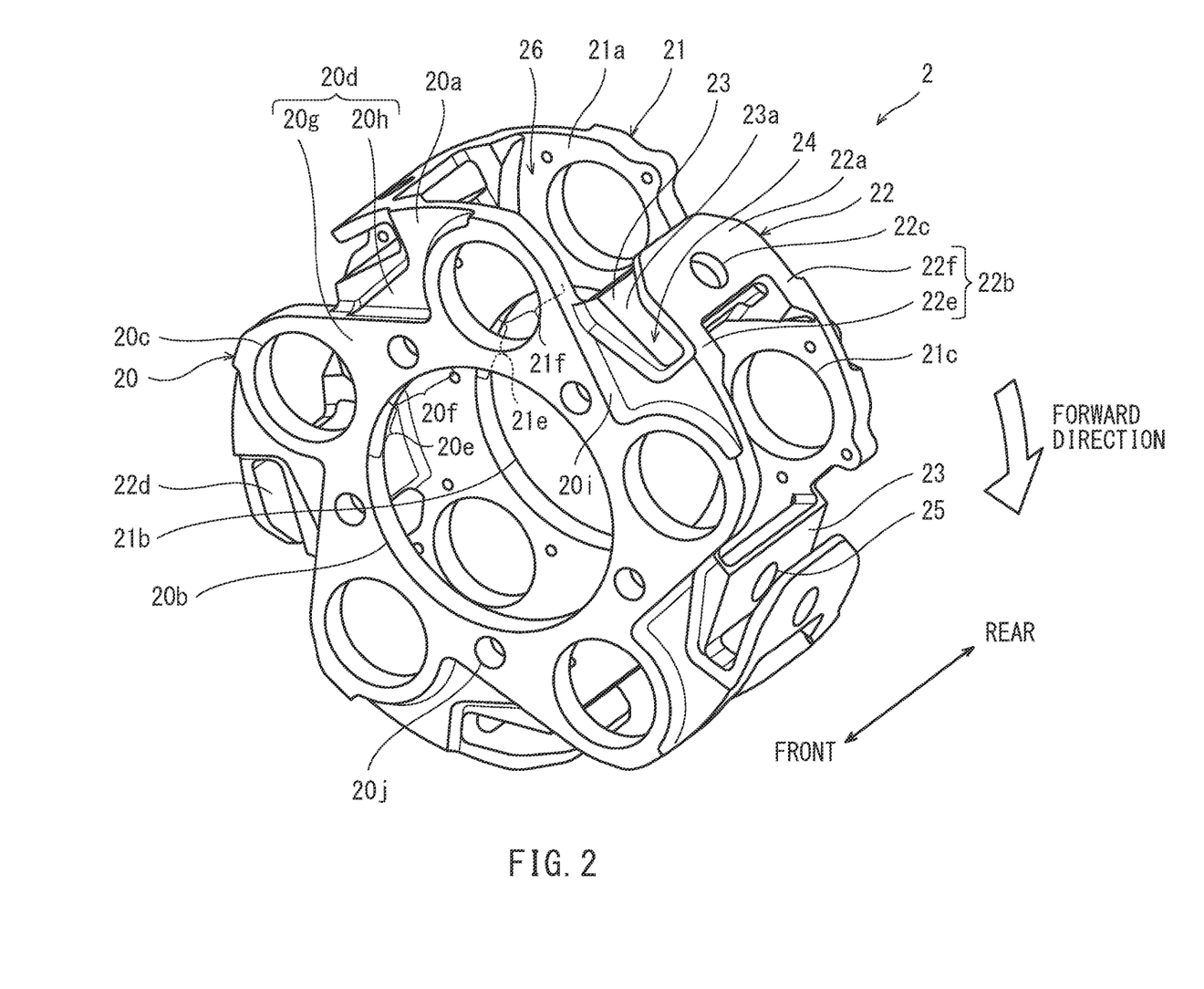
FIG. 2 is a front perspective view of a planetary cater shown in FIG. 1.
Figure 3:
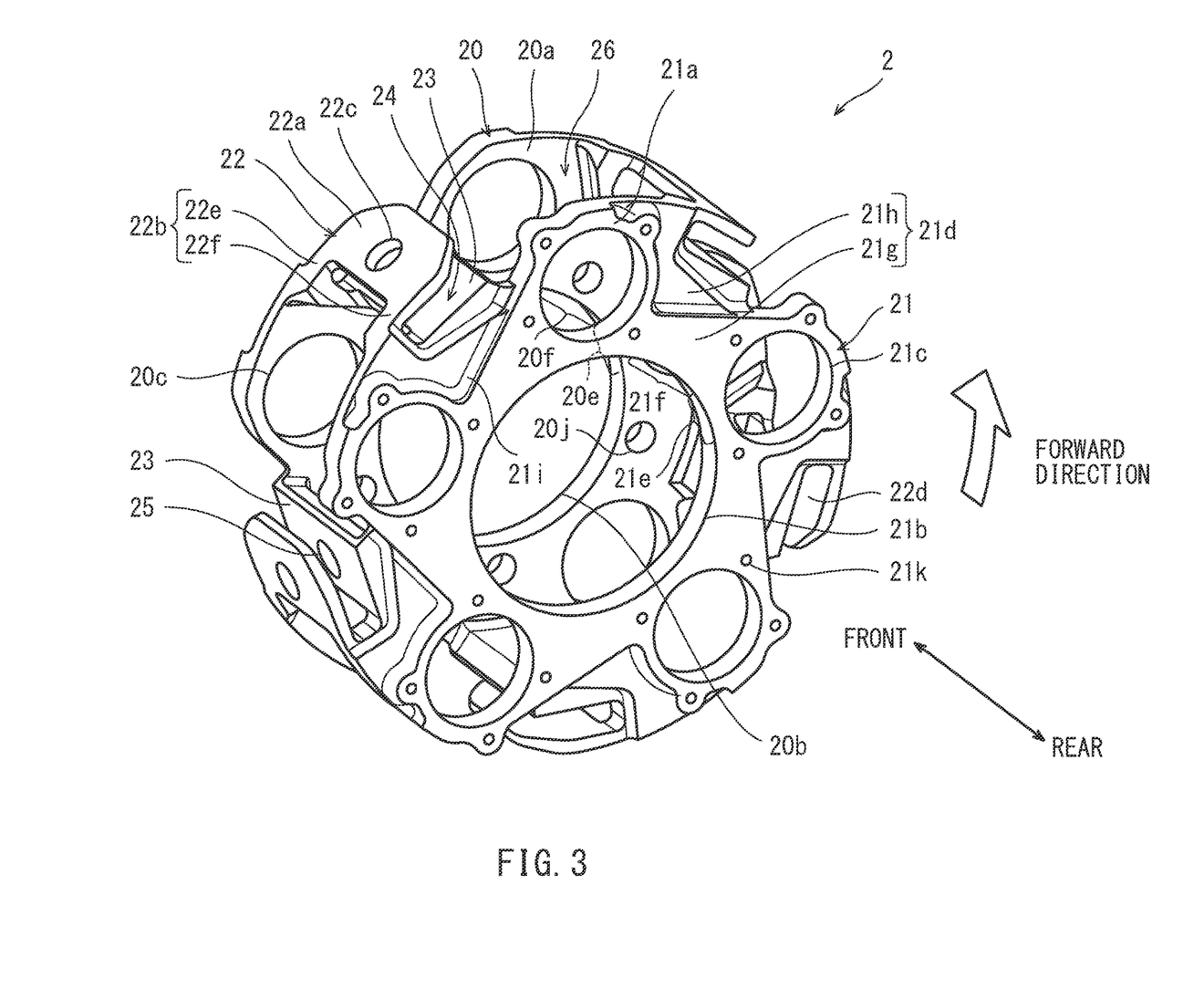
FIG. 3 is a rear perspective view of the planetary carrier shown in FIG. 1.

FIG. 1 is a front view of a planetary gear mechanism 1 according to Embodiment 1. FIG. 2 is a front perspective view of the planetary carrier 2 shown in FIG. 1. FIG. 3 is a rear perspective view of the planetary carrier 2 shown in FIG. 1. In FIG. 1, contours of gears 3 to 5, support shafts S1 and S2, and external members 8 are schematically shown by one-dot chain lines, and contours of parts of pins 9 and internal coupling plates 23 are shown by broken lines. The planetary gear mechanism 1 shown in FIG. 1 is included in an aircraft together with an engine. The planetary gear mechanism 1 is included in a power transmission mechanism of the engine. As one example, the engine is a gas turbine engine. The planetary gear mechanism 1 includes the planetary carrier 2, the planetary gears 3, the sun gear 4, and the ring gear 5. As described below, the planetary carrier 2 is made lighter than conventional planetary carriers while securing rigidity required when the planetary carrier 2 rotates in a forward direction.

The sun gear 4 and the ring gear 5 mesh with the planetary gears 3. The sun gear 4 is located on and supported by the support shaft S1. The support shaft S1 is a rotating shaft that rotates together with the sun gear 4 around the support shaft S1. The planetary gears 3 are located on and supported by the support shafts S2. Each planetary gear 3 is located at the corresponding support shaft S2 so as to be rotatable relative to the corresponding support shaft S2. The planetary carrier 2 is pivotally supported by the support shafts S2 directly or indirectly through tubular or annular members, such as collars. As one example, the support shafts S1 and S2 of the present embodiment are located such that axes thereof are parallel to each other.

The sun gear 4 includes external teeth. Each planetary gear 3 includes external teeth that mesh with the external teeth of the sun gear 4. The ring gear 5 includes internal teeth that mesh with the external teeth of the planetary gears 3. Rotational power output from the engine is transmitted to the sun gear 4. The rotational power of the sun gear 4 is transmitted to the planetary gears 3.

The planetary carrier 2 is rotatable in a forward direction and a reverse direction. The forward direction is a direction toward the first side along the circumferential direction, and the reverse direction is a direction toward the second side along the circumferential direction. When the planetary gear mechanism 1 drives, the planetary carrier 2 mainly rotates in the forward direction. The planetary carrier 2 is an integrated product. As one example, the planetary carrier 2 is a processed product obtained by cutting a single material. Moreover, as one example, the material of the planetary carrier 2 includes a metal material.

The planetary carrier 2 includes the first plate 20, the second plate 21, and coupling plates 22. The first plate 20 includes a pair of plate surfaces 20a. The second plate 21 includes a pair of plate surfaces 21a. As shown in FIG. 2, the first plate 20 and the second plate 21 respectively include the plate surface 20a and the plate surface 21a which are opposed to each other at an inside of the planetary carrier 2. The planetary gears 3 are located between the above opposing plate surfaces 20a and 21a, are located on the circular path C so as to be spaced apart from each other, and are pivotally supported between the above opposing plate surfaces 20a and 21a. The first plate 20 and the second plate 21 support the planetary gears 3 through the support shafts S2. The above opposing plate surfaces 20a and 21a are located parallel to each other. Each of the support shafts S2 includes: one axial end portion supported by the first plate 20; and the other axial end portion supported by the second plate 21. Shaft centers P2 of the support shafts S2 are located at equal intervals in the circumferential direction.

The sun gear 4 is located at an inside in the radial direction in a space between the above opposing plate surfaces 20a and 21a of the first and second plates 20 and 21. As shown in FIG. 1, a shaft center P1 of the support shaft S1 coincides with a center of the circular path C. The ring gear 5 is located concentrically with the circular path C and is located outside the circular path C in the radial direction. As one example, the ring gear 5 of the present embodiment is a stationary body that does not move relative to an airframe of the aircraft. In other words, the ring gear 5 is an immovable portion of the planetary gear mechanism 1. When the planetary gear mechanism 1 drives, at an inside of the ring gear 5 in the radial direction which is the stationary body, the planetary gears 3 move on the circular path C while rotating on their axes by the rotational power transmitted from the sun gear 4.

The coupling plates 22 are located so as to be spaced apart from each other in the circumferential direction of the circular path C. The coupling plates 22 couple the first plate 20 and the second plate 21. The coupling plates 22 are displaced relative to the planetary gears 3 in the circumferential direction and are coupled to the external members 8. The coupling plates 22 are output portions that output the rotational power of the planetary carrier 2 to the external members 8. The external members 8 of the present embodiment couple the planetary carrier 2 to a component of the aircraft which is different from the planetary gear mechanism 1. The rotational power of the planetary carrier 2 is transmitted to the above component through the external members 8. This component is, for example, a fan shaft to which a fan that supplies outside air to an inside of the engine is fixed. The rotational power of the planetary carrier 2 rotates the fan together with the fan shaft about an axis of the fan shaft through the external members 8 and the fan shaft.

Each coupling plate 22 is coupled to the external member 8 at an outside of the circular path C in the radial direction and is coupled to the first plate 20 and the second plate 21 only at the first side. In the present embodiment, regarding positions in the circumferential direction, each of all the coupling plates 22 is located between two planetary gears 3 adjacent to each other in the circumferential direction.

Each coupling plate 22 includes an external coupling structure 22a and a plate coupling structure 22b. The external coupling structure 22a is located at the outside of the circular path C in the radial direction and is coupled to the external member 8. The external coupling structure 22a is located such that a thickness direction thereof coincides with the radial direction. The plate coupling structure 22b is continuous with the first side of the external coupling structure 22a and is coupled to the first plate 20 and the second plate 21. The external coupling structure 22a includes a support hole 22c into which the pin 9 coupled to the external member 8 is inserted in the radial direction and which supports the pin 9. The plate coupling structure 22b is coupled to the first plate 20 and the second plate 21 only at the first side.

The first plate 20 includes a first shaft hole 20b and second shaft holes 20c, and the second plate 21 includes a first shaft hole 21b and second shaft holes 21c. The first shaft hole 20b is located at an inside of the plate 20 in the radial direction, and the first shaft hole 21b is located at an inside of the plate 21 in the radial direction. The support shaft S1 of the sun gear 4 is inserted into the first shaft holes 20b and 21b. The second shaft holes 20c are located at an outside of the first shaft hole 20b in the radial direction, and the second shaft holes 21c are located at an outside of the first shaft hole 21b in the radial direction. The support shafts S2 of the planetary gears 3 are inserted into the second shaft holes 20c and 21c. The second shaft holes 20c are located at intervals in the circumferential direction, and the second shaft holes 21c are located at intervals in the circumferential direction. As one example, in the present embodiment, inner diameters of the first shaft holes 20b and 21b are larger than those of the second shaft holes 20c and 21c.

A specific plate that is at least one of the first plate 20 and the second plate 21 includes lightening holes. The lightening holes penetrate below-described extending structures 20d and 21d in the thickness direction of the specific plate. In the present embodiment, the first plate 20 is the specific plate and includes lightening holes 20j. The lightening holes 20j are located at regular intervals in the circumferential direction.

The coupling plates 22 are external coupling plates, and the planetary carrier 2 further includes the internal coupling plates 23. Hereinafter, the coupling plates 22 are also called external coupling plates 22. The internal coupling plates 23 are bridges which couple an outer peripheral portion of the first plate 20 to an outer peripheral portion of the second plate 21. The internal coupling plates 23 are located at an inside of the external coupling plates 22 in the radial direction and are located at positions overlapping the external coupling plates 22 in the radial direction.

The first plate 20 includes extending structures 20d and intermediate structures 20e, and the second plate 21 includes extending structures 21d and intermediate structures 21e. Each extending structure 20d is located at the outside of the first shaft hole 20b in the radial direction, is located between two second shaft holes 20c adjacent to each other in the circumferential direction, and extends in the circumferential direction. Each extending structure 21d is located at the outside of the first shaft hole 21b in the radial direction, is located between two second shaft holes 21c adjacent to each other in the circumferential direction, and extends in the circumferential direction. Each intermediate structure 20e is located between two extending structures 20d adjacent to each other in the circumferential direction, and each intermediate structure 21e is located between two extending structures 21d adjacent to each other in the circumferential direction. The intermediate structure 20e is adjacent to the first shaft hole 20b in the radial direction, and the intermediate structure 21e is adjacent to the first shaft hole 21b in the radial direction.

As shown in FIG. 2, surfaces of the extending structures 20d which are located at a frontmost side and surfaces of the intermediate structures 20e which are located at the frontmost side are continuous with each other in the circumferential direction and are located in the same plane. Moreover, as shown in FIG. 3, surfaces of the extending structures 21*d* which are located at a rearmost side and surfaces of the intermediate structures 21*e* which are located at the rearmost side are continuous with each other in the circumferential direction and are located in the same plane. The extending structure 20*d* includes a specific structure 20*f* in which a section modulus of a section thereof perpendicular to the circumferential direction decreases from the second side toward the first side. The extending structure 21*d* includes a specific structure 21*f* in which a section modulus of a section thereof perpendicular to the circumferential direction decreases from the second side to the first side. The section modulus denotes a value defined in ISO 80000-4:2019, 4-22. For example, the specific structure 20*f* includes the second shaft hole 20*c*, and the specific structure 21*f* includes the second shaft hole 21*c*.

As shown in FIGS. 2 and 3, the specific structure 20*f* includes a thick plate structure 20*g* and a thin plate structure 20*h*, and the specific structure 21*f* includes a thick plate structure 21*g* and a thin plate structure 21*h*. The thick plate structure 20*g* defines a peripheral edge of the first shaft hole 20*b*, and the thick plate structure 21*g* defines a peripheral edge of the first shaft hole 21*b*. The thin plate structure 20*h* is continuous with the thick plate structure 20*g* at the outside in the radial direction, and the thin plate structure 21*h* is continuous with the thick plate structure 21*g* at the outside in the radial direction. The thin plate structure 20*h* is smaller in thickness in the front-rear direction than the thick plate structure 20*g*, and the thin plate structure 21*h* is smaller in thickness in the front-rear direction than the thick plate structure 21*g*. In the planetary carrier 2, the thin plate structures 20*h* are located so as to be spaced apart from each other in the circumferential direction, and the thin plate structures 21*h* are located so as to be spaced apart from each other in the circumferential direction. Moreover, the thin plate structures 20*h* and 21*h* are coupled to the external coupling plates 22.

The thin plate structures 20*h* and 21*h* are continuous with the plate coupling structures 22*b* of the external coupling plates 22. Moreover, as one example, the thick plate structure 20*g* includes a structure having a thickness that is the largest in the first plate 20, and the thick plate structure 21*g* includes a structure having a thickness that is the largest in the second plate 21. As one example, the structure having the largest thickness in the thick plate structure 20*g* defines peripheral edges of the first shaft hole 20*b* and the second shaft holes 20*c*, and the structure having the largest thickness in the thick plate structure 21*g* defines peripheral edges of the first shaft hole 21*b* and the second shaft holes 21*c*.

The external coupling plates 22 are located between the above opposing plate surfaces 20*a* and 21*a* and couple the first plate 20 and the second plate 21. The external coupling plates 22 extend from the thin plate structures 20*h* and 21*h* to the inside of the planetary carrier 2 in the front-rear direction. Each external coupling structure 22*a* includes a plate surface 22*d* extending in the circumferential direction and the front-rear direction. The width of the second side of the external coupling structure 22*a* of the present embodiment in the front-rear direction decreases from the first side toward the second side. The internal coupling plate 23 includes a plate surface 23*a* which is located so as to be opposed to the plate surface 22*d* located at an inside of the external coupling structure 22*a* of the external coupling plate 22 in the radial direction. The plate surface 23*a* extends in the circumferential direction and the front-rear direction. One end of the internal coupling plate 23 in the front-rear direction is coupled to the first plate 20, and the other end of the internal coupling plate 23 in the front-rear direction is coupled to the second plate 21. An end portion of the second side of the internal coupling plate 23 and an end portion of the second side of the external coupling plate 22 are spaced apart from each other.

The planetary carrier 2 includes insertion spaces 24 each of which is located between the internal coupling plate 23 and the external coupling plate 22 in the radial direction and into each of which the external member 8 is inserted from an outside. As one example, surfaces of the external member 8 inserted into the insertion space 24 are partially in surface contact with the plate surfaces 22*d* and 23*a*. Moreover, as one example, each of the external coupling plates 22 and the internal coupling plates 23 is located such that a thickness direction thereof coincides with the radial direction. The largest thickness of the external coupling plate 22 is smaller than the largest thickness of the internal coupling plate 23. The insertion spaces 24 of the present embodiment are open toward the second side and in the front-rear direction.

The plate coupling structure 22*b* includes a bridge 22*e* and a bridge 22*f*. The bridge 22*e* extends from an end portion of the first side of the external coupling structure 22*a* toward the first plate 20. The bridge 22*f* extends from this end portion toward the second plate 21. The external coupling structure 22*a* is coupled to the first plate 20 and the second plate 21 at the end portion of the first side by the pair of bridges 22*e* and 22*f*. An end portion of the second side of the external coupling structure 22*a* is spaced apart from the first plate 20 and the second plate 21. Therefore, the end portion of the second side of the external coupling structure 22*a* is a free end.

Edge ends of the external coupling plates 22 and the internal coupling plates 23 in the front-rear direction are located at an inside of outer surfaces of the thin plate structures 20*h* and 21*h* in the front-rear direction in the planetary carrier 2. The thin plate structure 20*h* is adjacently located at an outside of the thick plate structure 20*g* in the radial direction, and the thin plate structure 21*h* is adjacently located at an outside of the thick plate structure 21*g* in the radial direction. The specific structure 20*f* includes a step 20*i* located at a boundary between the thick plate structure 20*g* and the thin plate structure 20*h*, and the specific structure 21*f* includes a step 21*i* located at a boundary between the thick plate structure 21*g* and the thin plate structure 21*h*. The width of the step 20*i* in the front-rear direction corresponds to a value obtained by subtracting the thickness of the thin plate structure 20*h* from the thickness of the thick plate structure 20*g*, and the width of the step 21*i* in the front-rear direction corresponds to a value obtained by subtracting the thickness of the thin plate structure 21*h* from the thickness of the thick plate structure 21*g*. The steps 20*i* and 21*i* are exposed to an outside of the planetary cater 2 in the front-rear direction. The above opposing plate surfaces 20*a* and 21*a* are flat surfaces.

Figure 4:
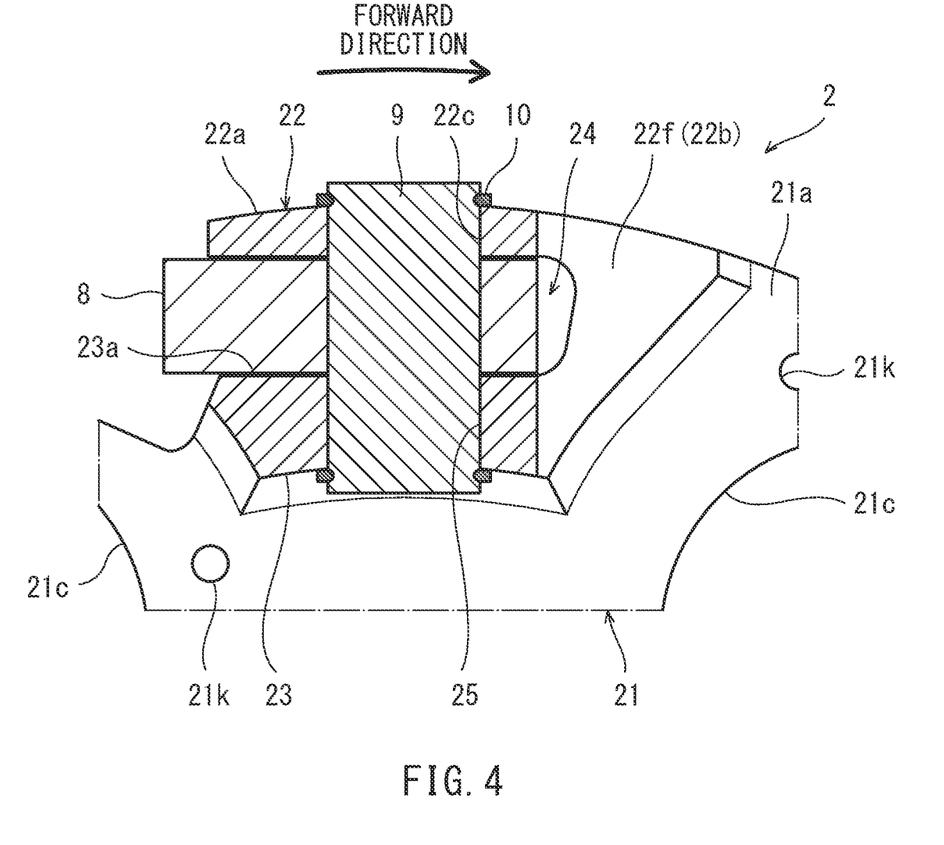
FIG. 4 is a radial sectional view of part of the planetary carrier of FIG. 1.

The internal coupling plate 23 includes a support hole 25. The pin 9 coupled to the external member 8 is inserted into the support hole 25 and the support hole 22*c* of the external coupling structure 22*a* in the radial direction, and therefore, the support hole 25 supports the pin 9. FIG. 4 is a radial sectional view of part of the planetary carrier 2 of FIG. 1. FIG. 4 shows: the plate surface 21*a* of the second plate 21 when viewed from the front side; the bridge 22*f* of the plate coupling structure 22*b* extending from the plate surface 21*a* when viewed from the front side; and sections of the external coupling structure 22*a*, the internal coupling plates 23, the pin 9, and retainers 10.

The planetary gear mechanism 1 includes a retainer structure that prevents the pin 9 from falling from the support holes 22c and 25 and the external member 8. As shown in FIG. 4, as one example, the retainer structure includes a pair of retainers 10 which are located at both axial ends of the pin 9 and extend around an axis of the pin 9. The retainers 10 contact a peripheral edge of the support hole 22c of the external coupling structure 22a and a peripheral edge of the support hole 25 of the internal coupling plate 23 to prevent the pin 9 in the support holes 22c and 25 and the external member 8 from falling. Thus, the pin 9 is stably supported by the external coupling plate 22 and the internal coupling plate 23, and the internal coupling plate 23 and the external coupling plate 22 are coupled to the external member 8. As above, in addition to the external coupling plate 22, the planetary carrier 2 may include the internal coupling plate 23 coupled to the external member 8.

As shown in FIGS. 2 and 3, the planetary carrier 2 includes gear insertion openings 26 which are open to the outside and the inside in the radial direction. Each gear insertion opening 26 is located between two adjacent external coupling plates 22 which are spaced apart from each other in the circumferential direction. As one example, a maximum width of the gear insertion opening 26 in the circumferential direction is larger than a maximum width of the gear insertion opening 26 in the front-rear direction. When assembling the planetary gear mechanism 1, the planetary gear 3 is inserted into a space between the first plate 20 and the second plate 21 through the gear insertion opening 26 from an outside.

Between one planetary gear 3 and each of two internal coupling plates 23 located at the first side and second side of this planetary gear 3, there exists such an adequate clearance that this planetary gear 3 does not interfere with the planetary carrier 2. Between this planetary gear 3 and each of two external coupling plates 22 located at the first side and second side of this planetary gear 3, there exists such an adequate clearance that this planetary gear 3 does not interfere with the planetary carrier 2. In the planetary carrier 2, the internal coupling plate 23 and the external coupling plate 22 which are located at positions overlapping each other in the radial direction are located in a region between the two adjacent shaft holes 20c and between the two adjacent shaft holes 21c. The gear insertion openings 26 are located at the outside of the shaft holes 20c and 21c in the radial direction.

The second plate 21 does not include holes corresponding to the lightening holes 20j of the first plate 20. As one example, the second plate 21 includes insertion holes 21k which are located on the plate surface 21a and into which fasteners used to attach a separate member to the planetary carrier 2 are inserted. At least some of the insertion holes 21k are located so as to surround the second shaft holes 21c. The contours of the steps 20i and 21i when viewed in the front-rear direction may coincide with each other or may be different from each other. In the present embodiment, as one example, the contours of the steps 20i and 21i when viewed in the front-rear direction coincide with each other.

Figure 5:
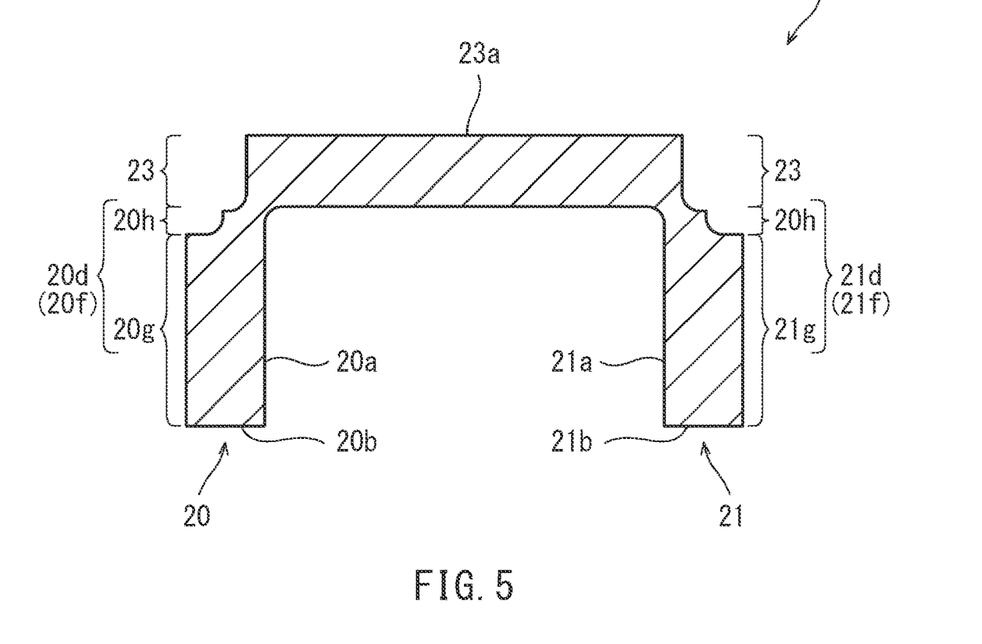
FIG. 5 is a sectional view taken along line V-V of FIG. 1 showing the planetary carrier.
Figure 6:
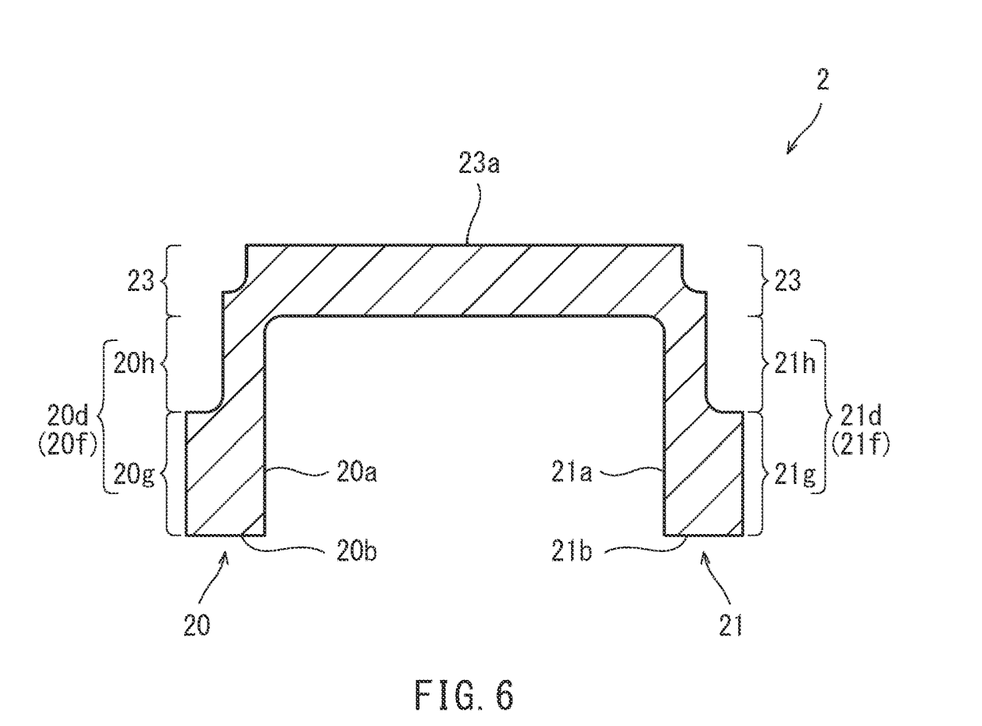
FIG. 6 is a sectional view taken along line VI-VI of FIG. 1 showing the planetary carrier.
Figure 7:
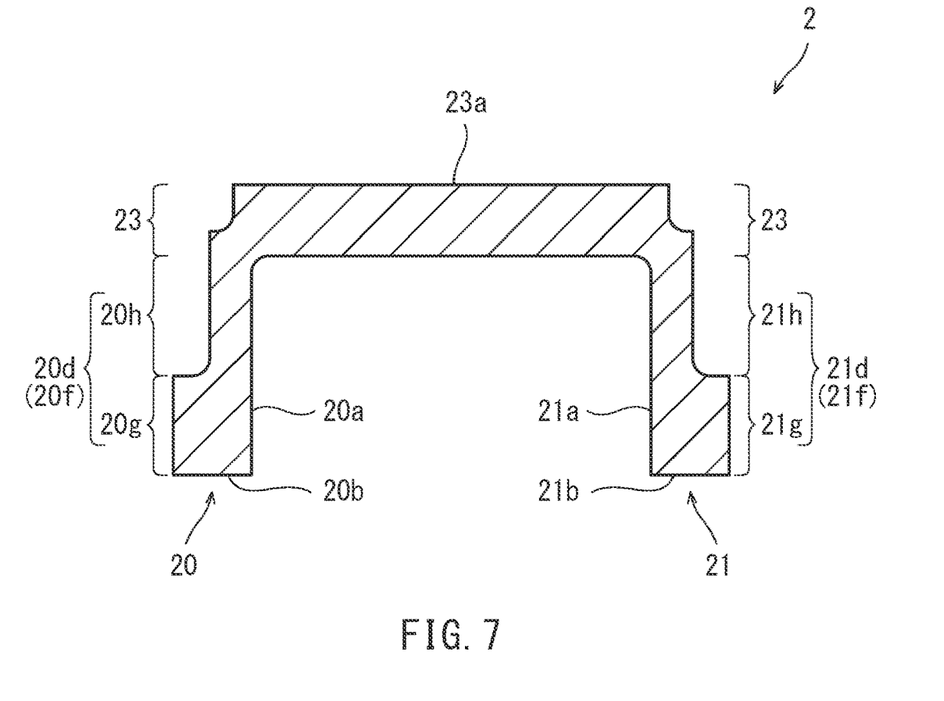
FIG. 7 is a sectional view taken along line VII-VII of FIG. 1 showing the planetary carrier.

Next, specific configuration examples of the specific structures 20f and 21f will be described. FIG. 5 is a sectional view taken along line V-V of FIG. 1 showing the planetary carrier 2. A section taken along line V-V includes: a section of the second side of one internal coupling plate 23 included in the planetary carrier 2; and sections of the specific structures 20f and 21f. FIG. 6 is a sectional view taken along line VI-VI of FIG. 1 showing the planetary carrier 2. A section taken along line VI-VI includes: a section of the first side of the above internal coupling plate 23; and the sections of the specific structures 20f and 21f. FIG. 7 is a sectional view taken along line VII-VII of FIG. 1 showing the planetary carrier 2. A section taken along line VII-VII includes: a section in the vicinity of an end surface of the first side of the above internal coupling plate 23; and the sections of the specific structures 20f and 21f. The section taken along line V-V, the section taken along line VI-VI, and the section taken along line VII-VII are sections of the planetary carrier 2 at positions which are spaced apart from each other in this order toward the first side in the circumferential direction. FIGS. 5 to 7 show the sections perpendicular to the circumferential direction of the planetary carrier 2.

The section moduluses of the specific structures 20f and 21f change by changing the shapes and sectional areas of the sections of the specific structures 20f and 21f which are perpendicular to the circumferential direction. For example, the section moduluses of the specific structures 20f and 21f increase as the sectional areas of the sections perpendicular to the circumferential direction increases, i.e., the section moduluses decrease as the sectional areas decrease. Therefore, when changing the section moduluses of the specific structures 20f and 21f by the sectional areas of the specific structures 20f and 21f, the sectional areas can be set so as to decrease from the second side toward the first side. In the present embodiment, since the sectional areas of the specific structures 20f and 21f decrease from the second side toward the first side, the section moduluses of the specific structures 20f and 21f decrease from the second side toward the first side.

Each of the sections of the specific structures 20f and 21f shown in FIG. 5 has a certain degree of sectional area. On the other hand, each of the sections of the specific structures 20f and 21f shown in FIG. 6 has a smaller sectional area than the corresponding section shown in FIG. 5. Moreover, each of the sections of the specific structures 20f and 21f shown in FIG. 7 has a smaller sectional area than the corresponding section shown in FIG. 6.

As above, the sectional areas of the specific structures 20f and 21f which are perpendicular to the circumferential direction decrease from the second side toward the first side. Therefore, the section moduluses of the specific structures 20f and 21f decrease from the second side toward the first side between a position of the section taken along line V-V and a position of the section taken along line VII-VII. Thus, at the specific structures 20f and 21f, the weight reduction of the planetary carrier 2 is realized between the position of the section taken along line V-V and the position of the section taken along line VII-VII. As one example, the specific structure 20f is located at a portion of the extending structure 20d which overlaps an entire circumferential-direction region of the insertion space 24 in the radial direction, and the specific structure 21f is located at a portion of the extending structure 21d which overlaps an entire circumferential-direction region of the insertion space 24 in the radial direction. Moreover, in the present embodiment, as one example, regarding the specific structure 20f including the thick plate structure 20g and the specific structure 21f including the thick plate structure 21g, the sectional area of the thick plate structure 20g which is perpendicular to the circumferential direction decreases from the second side toward the first side, and the sectional area of the thick plate structure 21g which is perpendicular to the circumferential direction decreases from the second side toward the first side.

In the planetary gear mechanism 1 configured as above, when the rotational power from the engine is input to the support shaft S1 that is the rotating shaft, and this rotates the sun gear 4, the rotational power of the sun gear 4 is transmitted to the planetary gears 3. Thus, the planetary gears 3 move on the circular path C while rotating on their axes. By the movements of the planetary gears 3 on the circular path C, the planetary carrier 2 rotates about the support shaft S1 of the sun gear 4. The rotational force of the planetary carrier 2 is transmitted to the above component through the external members 8. Thus, the component is rotated.

According to the above-described configuration, each coupling plate 22 is coupled to the first plate 20 and the second plate 21 only at the first side. Therefore, when the planetary carrier 2 is rotated in the forward direction, not compressive stress but tensile stress acts on the external coupling structure 22a from the plate coupling structure 22b in the coupling plate 22. Thus, the rigidity of the planetary carrier 2 during the rotation is secured. The frequency of the rotation of the planetary carrier 2 in the reverse direction opposite to the forward direction is relatively low. Therefore, the planetary carrier 2 does not have to include a large-scale structure that secures rigidity with respect to stress that acts when the planetary carrier 2 is rotated in the reverse direction. Thus, the planetary carrier 2 does not include a coupling structure that couples the second side of each coupling plate 22 to the first plate 20 and the second plate 21. Therefore, since the first side in the circumferential direction is set as the forward direction of the rotational direction of the planetary carrier 2, while securing the required rigidity of the planetary carrier 2 which is required when the planetary carrier 2 is rotated in the forward direction, the planetary carrier 2 can be reduced in weight.

Moreover, the extending structure 20d of the first plate 20 includes the specific structure 20f in which the section modulus of the section thereof perpendicular to the circumferential direction decreases from the second side toward the first side, and the extending structure 21d of the second plate 21 includes the specific structure 21f in which the section modulus of the section thereof perpendicular to the circumferential direction decreases from the second side toward the first side. Therefore, the planetary carrier 2 can be reduced in weight while securing the required rigidity of the planetary carrier 2.

Moreover, the sectional areas of the specific structures 20f and 21f which are perpendicular to the circumferential direction decrease from the second side toward the first side. Therefore, the planetary carrier 2 can be reduced in weight while securing the required rigidity of the planetary carrier 2.

Moreover, the sectional areas of the thick plate structures 20g and 21g which are perpendicular to the circumferential direction decrease from the second side toward the first side. Therefore, while securing the required rigidity of the planetary carrier 2, the planetary carrier 2 can be reduced in weight by changing the sectional areas of the thick plate structures 20g and 21g as described above.

Moreover, the thick plate structure 20g includes the structure having the thickness that is the largest in the first plate 20, and the thick plate structure 21g includes the structure having the thickness that is the largest in the second plate 21. Therefore, while securing the required rigidity of the planetary carrier 2, the planetary carrier 2 can be reduced in weight.

Moreover, the specific plate includes the lightening holes 20j which penetrate the extending structure 20d or 21d in the thickness direction of the specific plate. Therefore, the planetary carrier 2 can be further reduced in weight.

Moreover, the external member 8 is inserted into the insertion space 24 between the external coupling plate 22 and the internal coupling plate 23. Therefore, the external member 8 can be sandwiched by the external coupling plate 22 and the internal coupling plate 23 in the radial direction. Thus, the external member 8 and the planetary carrier 2 can be easily and stably coupled to each other in the insertion space 24.

Moreover, the pin 9 coupled to the external member 8 is supported by the support hole 22c located at the external coupling plate 22 and the support hole 25 located at the internal coupling plate 23. Therefore, the external coupling plate 22 and the internal coupling plate 23 can be coupled to the external member 8 by using the pin 9. As above, the external member 8 can be stably coupled to the planetary carrier 2 by using the two coupling plates 22 and 23.

Moreover, the largest thickness of the external coupling plate 22 is smaller than the largest thickness of the internal coupling plate 23. Therefore, for example, by making the internal coupling plate 23 smaller in thickness than the external coupling plate 22, the planetary carrier 2 can be reduce in weight.

Moreover, in the planetary carrier 2, the internal coupling plate 23 and the external coupling plate 22 which are located at positions overlapping each other in the radial direction are located in the region between the two adjacent shaft holes 20c and between the two adjacent shaft holes 21c, and the gear insertion openings 26 are located at the outside of the shaft holes 20c and 21c in the radial direction.

According to the above configuration, the planetary gears 3 can be assembled to the planetary carrier 2 through the gear insertion openings 26 from the outside while avoiding the interference of the planetary gears 3 with the internal coupling plate 23 and the external coupling plate 22. Moreover, for example, even when the outer diameter of the planetary gear 3 is larger than the inner diameter of the first shaft hole 20b, and therefore, the planetary gear 3 cannot be inserted into the planetary carrier 2 through the first shaft hole 20b, the planetary gears 3 can be assembled to the planetary carrier 2 from the outside. Therefore, the deterioration of the degree of freedom of the design of the planetary gear mechanism 1 by restrictions of the shapes, sizes, and the like of the planetary carrier 2 and the planetary gears 3 can be suppressed. In addition, the manufacturing efficiency of the planetary gear mechanism 1 can be improved by simplifying the process of assembling the planetary gear mechanism 1. Hereinafter, in Embodiment 2, differences from Embodiment 1 will be mainly described.

Embodiment 2

Figure 8:
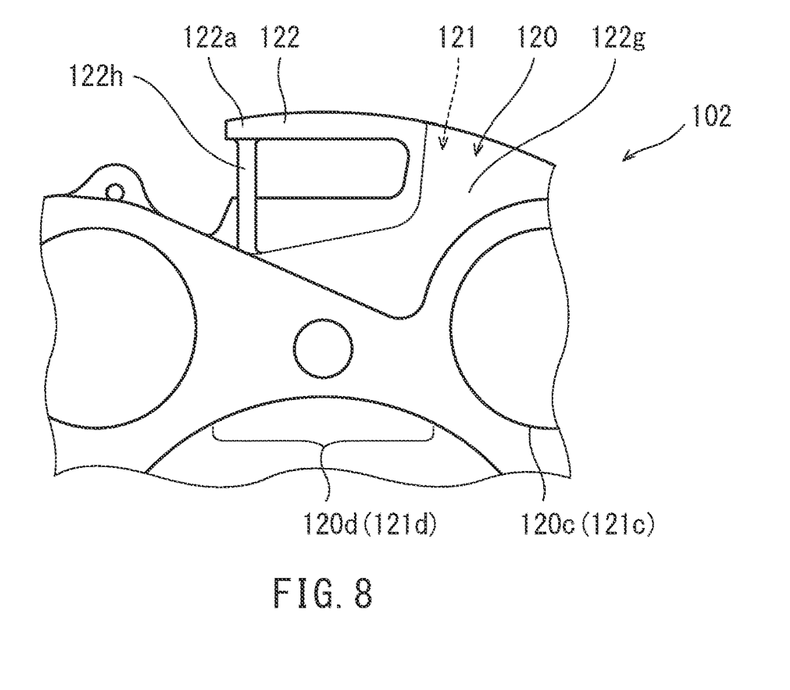
FIG. 8 is a front view showing part of the planetary carrier according to Embodiment 2.

FIG. 8 is a front view showing part of the planetary carrier 102 according to Embodiment 2. Each of coupling plates 122 of the planetary carrier 102 shown in FIG. 8 is located at the outside of the circular path C in the radial direction and is coupled to the external member 8. In addition, each coupling plate 122 is coupled to a first plate 120 and a second plate 121 at the first side and the second side and is coupled to the first plate 120 and the second plate 121 at the first side with higher rigidity than the second side.

Specifically, as one example, each coupling plate 122 of the present embodiment includes a first coupling structure 122g and a second coupling structure 122h. The first coupling structure 122g is coupled to the first plate 120 and the second plate 121 at the first side, and the second coupling structure 122h is directly coupled to the first plate 120 and the second plate 121 at the second side. The second coupling structure 122h couples an external coupling structure 122a and an extending structure 120d or 121d in the radial direction. The second coupling structure 122h transmits reaction force, which is applied from a peripheral edge of a second shaft hole 120c or 121c, to the external coupling structure 122a. When viewed in the front-rear direction, the second coupling structure 122h has a shaft shape extending in the radial direction. The first coupling structure 122g is coupled to the first plate 120 and the second plate 121 with higher rigidity than the second coupling structure 122h.

In Embodiment 2, the same effects as Embodiment 1 are obtained. To be specific, when the planetary carrier 102 is rotated in the forward direction, not compressive stress but tensile stress acts on the external coupling structure 122a from the first coupling structure 122g in the coupling plate 22. Thus, the rigidity of the planetary carrier 102 during the rotation is secured. Moreover, in the planetary carrier 102, the configuration of the second coupling structure 122h is simpler than that of the first coupling structure 122g. Therefore, since the first side in the circumferential direction is set as the forward direction of the rotational direction of the planetary carrier 102, while securing the required rigidity of the planetary carrier 102 which is required when the planetary carrier 102 is rotated in the forward direction, the planetary carrier 102 can be reduced in weight by the second coupling structure 122h.

The foregoing has described the embodiments as examples of the technology disclosed in the present application. However, the technology in the present disclosure is not limited to these and is applicable to embodiments in which modifications, replacements, additions, omissions, and the like have been suitably made. Moreover, anew embodiment may be prepared by combining the components described in the above embodiments. For example, some of components or methods in one embodiment may be applied to another embodiment. Some components in an embodiment may be separated from the other components in the embodiment and arbitrarily extracted. Furthermore, the components shown in the attached drawings and the detailed explanations include not only components essential to solve the problems but also components for exemplifying the above technology and not essential to solve the problems.

Each of the planetary carriers 2 and 102 is not limited to an integrated member and may include members. In addition to the lightening holes 20j, the specific plate may include a depressed portion that is depressed in the thickness direction from a surface thereof. The depressed portion is located in a region of the specific plate which is located away from the lightening holes 20j. The depressed portion may be located in the vicinity of the lightening hole 20j or may be located between the lightening hole 20j and the second shaft hole 21c in the circumferential direction. Moreover, as long as the required rigidity of the planetary carrier 2 or 102 is secured, the lightening hole 20j may be included in the thin plate structure 20h included in the extending structure 20d. Furthermore, the inner diameters of the first shaft holes 20b and 21b may be smaller than those of the second shaft holes 20c and 21c.

Moreover, the above embodiments describe examples in which the planetary gear mechanism is used in a speed reducer of an aircraft engine. However, the planetary gear mechanism may be used as part of a power transmission mechanism of other purposes of use. The above embodiments describe the planetary gear mechanism of a planetary type in which the ring gear is fixed, and the sun gear and the planetary carrier rotate. However, the planetary gear mechanism may be of a star type in which the planetary carrier is fixed, and the sun gear and the ring gear rotate. In this case, the forward direction of the rotation of the stationary planetary carrier denotes a relative rotational direction of the planetary carrier relative to the rotating ring gear. The planetary gear mechanism may be of a solar type in which the sun gear is fixed, and the ring gear and the planetary carrier rotate.

Moreover, the inner diameter of the first shaft hole 20b and the inner diameter of the second shaft hole 20c may be the same as each other or may be different from each other, and the inner diameter of the first shaft hole 21b and the inner diameter of the second shaft hole 21c may be the same as each other or may be different from each other. The inner diameter of the second shaft hole 20c may be larger than that of the first shaft hole 20b, and the inner diameter of the second shaft hole 21c may be larger than that of the first shaft hole 21b. Furthermore, the inner diameters of the first shaft holes 20b and 21b may be different from each other, and the inner diameters of the second shaft holes 20c and 21c may be different from each other. Moreover, the second shaft holes 20c may include a shaft hole having a different inner diameter, and the second shaft holes 21c may include a shaft hole having a different inner diameter. Furthermore, the lightening hole 20j may be an insertion hole into which a separate part included in an aircraft is inserted. One example of such separate part in this case is a nozzle that ejects a fluid. However, such separate part is not limited to this.

What is claimed is:

1. A planetary carrier comprising:
   a first plate and a second plate which pivotally support planetary gears between opposing plate surfaces of the first and second plates such that the planetary gears are located on a circular path so as to be spaced apart from each other, the circular path being a path of rotational centers of the planetary gears; and
   coupling plates which are located between the opposing plate surfaces, are spaced apart from each other in a circumferential direction of the circular path, couple the first plate and the second plate, and are coupled to external members at positions away from the planetary gears in the circumferential direction, wherein:
   the coupling plates are coupled to the external members at an outside of the circular path in a radial direction;
   each of the coupling plates is coupled to the first plate and the second plate only at a first side of each coupling plate in the circumferential direction; and
   each of the coupling plates is spaced apart from the first plate and the second plate at a second side opposite the first side in the circumferential direction.

2. The planetary carrier according to claim 1, wherein: each of the first plate and the second plate includes
   a first shaft hole which is located at an inside in the radial direction and into which a support shaft supporting a sun gear is inserted,
   second shaft holes which are located at an outside of the first shaft hole in the radial direction and into which support shafts supporting the planetary gears are inserted, and
   an extending structure which is located at the outside of the first shaft hole in the radial direction, is located between the two adjacent second shaft holes, and extends in the circumferential direction; and
   the extending structure includes a specific structure in which a section modulus of a section thereof perpendicular to the circumferential direction decreases from a second side toward the first side.

3. The planetary carrier according to claim 2, wherein a sectional area of the specific structure which is perpendicular to the circumferential direction decreases from the second side toward the first side.

4. The planetary carrier according to claim 2, wherein:
the specific structure includes
a thick plate structure that defines a peripheral edge of the first shaft hole and
a thin plate structure which is continuous with the thick plate structure at an outside in the radial direction and is smaller in thickness than the thick plate structure; and
a sectional area of the thick plate structure which is perpendicular to the circumferential direction decreases from the second side toward the first side.

5. The planetary carrier according to claim 4, wherein the thick plate structure includes a structure having a thickness that is largest in the first plate or the second plate.

6. The planetary carrier according to claim 2, wherein a specific plate that is at least one of the first plate and the second plate includes a lightening hole that penetrates the extending structure in a thickness direction of the specific plate.

7. The planetary carrier according to claim 1, wherein the coupling plates are external coupling plates,
the planetary carrier further comprising:
internal coupling plates which are located at an inside of the external coupling plates in the radial direction, are located at positions overlapping the external coupling plates in the radial direction, and couple the first plate and the second plate; and
insertion spaces each of which is located between the internal coupling plate and the external coupling plate in the radial direction and into which the external members are inserted from an outside.

8. The planetary carrier according to claim 7, further comprising support holes which are located at the internal coupling plates, into which pins coupled to the external members are inserted in the radial direction, and which support the pins.

9. The planetary carrier according to claim 7, wherein:
each of the external coupling plates and the internal coupling plates has a plate shape having a thickness direction that coincides with the radial direction; and
a largest thickness of the external coupling plate is smaller than a largest thickness of the internal coupling plate.

10. The planetary carrier according to claim 7, further comprising gear insertion openings each of which is located between the two adjacent external coupling plates when the external coupling plates are located so as to be spaced apart from each other in the circumferential direction, the planetary gear being inserted into a space between the first plate and the second plate from the outside through the gear insertion opening, wherein:
the first plate and the second plate include shaft holes into which support shafts of the planetary gears are inserted;
the internal coupling plate and the external coupling plate which are located at positions overlapping each other in the radial direction are located in a region between the two adjacent shaft holes; and
the gear insertion openings are located at an outside of the shaft holes in the radial direction.

11. A planetary gear mechanism comprising:
the planetary carrier according to claim 1;
planetary gears which are located between the opposing plate surfaces of the first and second plates, are located on the circular path so as to be spaced apart from each other, and are pivotally supported between the opposing plate surfaces;
a sun gear which is located at an inside in the radial direction between the opposing plate surfaces and meshes with the planetary gears between the opposing plate surfaces; and
a ring gear which is located concentrically with the circular path, is located at an outside in the radial direction, and meshes with the planetary gears.

12. A planetary carrier comprising:
a first plate and a second plate which pivotally support planetary gears between opposing plate surfaces of the first and second plates such that the planetary gears are located on a circular path so as to be spaced apart from each other, the circular path being a path of rotational centers of the planetary gears; and
coupling plates which are located between the opposing plate surfaces, are spaced apart from each other in a circumferential direction of the circular path, couple the first plate and the second plate, and are coupled to external members at positions away from the planetary gears in the circumferential direction, wherein:
each of the coupling plates includes
a first coupling structure coupled to the first plate and the second plate at a first side in the circumferential direction and
a second coupling structure coupled to the first plate and the second plate at a second side in the circumferential direction;
the coupling plates are located at an outside of the circular path in a radial direction and are coupled to the external members; and
the first coupling structure is higher in rigidity than the second coupling structure.

* * * * *